United States Patent [19]

Collin

[11] Patent Number: 5,030,806

[45] Date of Patent: Jul. 9, 1991

[54] TRANSACTION SYSTEM OF THE ELECTRONIC PURSE TYPE

[75] Inventor: Thierry Collin, Courbevoie, France

[73] Assignee: Electronique Serge Dassault, Saint-Cloud, France

[21] Appl. No.: 606,563

[22] Filed: Oct. 31, 1990

Related U.S. Application Data

[63] Continuation of Ser. No. 350,146, May 10, 1989, Pat. No. 4,992,646.

[30] Foreign Application Priority Data

May 30, 1988 [FR] France ............................ 88 07176
Nov. 25, 1988 [FR] France ............................ 88 15466

[51] Int. Cl.$^5$ .............................................. G06K 5/00
[52] U.S. Cl. .................................. 235/375; 235/380; 235/492
[58] Field of Search ............... 235/375, 379, 380, 492, 235/494

[56] References Cited

U.S. PATENT DOCUMENTS

| | | | | |
|---|---|---|---|---|
| 4,001,550 | 1/1977 | Schatz | ................................. | 235/375 |
| 4,204,113 | 5/1980 | Giraud et al. | ................................. | 235/375 |
| 4,265,955 | 5/1980 | Giraud | ................................. | 235/380 |
| 4,367,402 | 1/1983 | Giraud | ................................. | 235/380 |
| 4,822,984 | 4/1989 | Remery | ................................. | 235/375 |

FOREIGN PATENT DOCUMENTS 2403597  4/1979  France .
2503423 10/1982  France .

Primary Examiner—Harold Pitts
Attorney, Agent, or Firm—Christie, Parker & Hale

[57] ABSTRACT

A card (2) having a memory microcircuit (20) with access thereto under the control of a hard-wired logic circuit or a microprocessor (21) is suitable for cooperating with a terminal (1). A memory in EPROM technology (or in E$^2$PROM technology) includes value words (e.g., thirty-two bit words comprising twenty-five value bits, four bits for coding the value unit of each value bit, and a verification bit). By loading a plurality of words into the memory so as to set up a sequence of value units spread over successive powers of 2, the calculation means can split up the amount of any transaction less than the maximum value of the card into binary form very simply, and then consume not more than one bit per value unit (optionally other than the most significant value unit) in respect of each transaction.

17 Claims, 7 Drawing Sheets

| CODE | UV | VAL 1 | No. | VAL. MAX |
|---|---|---|---|---|
| ϕ | ϕϕϕϕ | 0.05 | — | — |
| 1 | ϕϕϕ1 | 0.10 | ≤ 25 | 2.5 |
| 2 | ϕϕ1ϕ | 0.20 | ≤ 25 | 5 |
| 3 | ϕϕ11 | 0.40 | ≤ 25 | 10 |
| 4 | ϕ1ϕϕ | 0.80 | ≤ 25 | 20 |
| 5 | ϕ1ϕ1 | 1.60 | ≤ 25 | 40 |
| 6 | ϕ11ϕ | 3.20 | ≤ 25 | 80 |
| 7 | ϕ111 | 6.40 | ≤ 25 | 160 |
| 8 | 1ϕϕϕ | 12.80 | ≤ 25 | 320 |
| MAX. TOTAL | | 25.50 | | 637.5 |

| CODE | UV | VAL 1 | No. | VAL.MAX |
|---|---|---|---|---|
| ϕ | ϕϕϕϕ | 0.05 | — | — |
| 1 | ϕϕϕ1 | 0.10 | ≤ 25 | 2.5 |
| 2 | ϕϕ1ϕ | 0.20 | ≤ 25 | 5 |
| 3 | ϕϕ11 | 0.40 | ≤ 25 | 10 |
| 4 | ϕ1ϕϕ | 0.80 | ≤ 25 | 20 |
| 5 | ϕ1ϕ1 | 1.60 | ≤ 25 | 40 |
| 6 | ϕ11ϕ | 3.20 | ≤ 25 | 80 |
| 7 | ϕ111 | 6.40 | ≤ 25 | 160 |
| 8 | 1ϕϕϕ | 12.80 | ≤ 25 | 320 |
| MAX. TOTAL | | 25.50 | | 637.5 |

FIG.5

| CODE | UV | VAL | No. | VAL.MAX. |
|---|---|---|---|---|
| ϕ | ϕϕϕϕ | 0.05 | — | — |
| 1 | ϕϕϕ1 | 0.1 | ≤ 25 | 2.5 |
| 2 | ϕϕ1ϕ | 0.2 | ≤ 25 | 5 |
| 3 | ϕϕ11 | 0.4 | ≤ 25 | 10 |
| 4 | ϕ1ϕϕ | 0.8 | ≤ 25 | 20 |
| 5 | ϕ1ϕ1 | 1.6 | ≤ 25 | 40 |
| 6 | ϕ11ϕ | 3.2 | ≤ 25 | 80 |
| 7 | ϕ111 | 6.4 | ≤ 25 | 160 |
| 8 | 1ϕϕϕ | 12.8 | ≤ 25 | 320 |
| 9 | 1ϕϕ1 | 25.6 | ≤ 25 | 640 |
| TOTAL | | 50.10 | | 1277.5 |

FIG.5A

| INSERT | VAL MAX | DIFF | DIFF/UVB | BIN(DIFF/UVB) | CODES |
|---|---|---|---|---|---|
| 400 | 637.50 | 237.5 | 2375 | 1 001 0    100 0111 | |
| | | | | 8 (18x)    7 | 321 |

FIG.6

| TRANSACTION | TRANS/UVB | BIN (TRANS/UVB) | CODES |
|---|---|---|---|
| 10 | 100 | 0/110 0100 | 7, 6, 3 |
| 15.5 | 155 | 1/001 1011 | 8, 5, 4, 2, 1 |
| 25.9 | 259 | 0001 0/000 0011 | 8 (2x), 2, 1 |
| 49.9 | 499 | 0001 1/111 0011 | 8(3x), 7, 6, 5, 2, 1 |

FIG.6A

| RE-LOAD | COND. | EXEC | VAL |
|---|---|---|---|
| ≤ 40 | — | 25 UV5 | 40 |
| ≤ 80 | — | 25 UV6 | 80 |
| ≤ 120 | NB UV5 > 12 & NB UV6 > 12 | 25 × UV7 | 160 |
|  | NB UV5 ≤ 12 OR NB UV6 ≤ 12 | 25 × UV5 + 25 × UV6 | 120 |
| ≤ 160 | — | 25 × UV7 | 160 |
| ≤ 200 | NB UV5 > 12 & NB UV7 > 12 | 25 × UV8 | 320 |
|  | NB UV5 ≤ 12 OR NB UV7 ≤ 12 | 25 × UV5 + 25 × UV7 | 200 |
| ≤ 240 | NB UV6 > 12 & NB UV7 > 12 | 25 × UV8 | 320 |
|  | NB UV6 ≤ 12 OR NB UV7 ≤ 12 | 25 × UV6 + 25 × UV7 | 240 |
| ≤ 320 | — | 25 × UV8 | 320 |
| > 320 | ≤ 360 | UV5 & UV8 | |
|  | ≤ 400 | UV6 & UV8 | |
|  | ≤ 480 | UV7 & UV8 | |
|  | ≤ 520 | UV5, UV7 & UV8 | |
|  | ≤ 560 | UV6, UV7 & UV8 | |
|  | ≤ 600 | UV5, UV6, UV7 & UV8 | |

FIG.8

| VAL | | | | | | | | | | VAL.TOT |
|---|---|---|---|---|---|---|---|---|---|---|
| RE·LOAD | 0.1 | 0.2 | 0.4 | 0.8 | 1.6 | 3.2 | 6.4 | 12.8 | | |
| | UV1 | UV2 | UV3 | UV4 | UV5 | UV6 | UV7 | UV8 | | |
| — | 5 | 3 | 15 | 8 | 13 | 12 | 7 | 3 | | 155.9 |
| +200 (A) | | | | | +25 | | +25 | | | 355.9 |
| +200 (B) | | | | | -1 | -1 | | +16 | | 355.9 |

FIG.8A

| CODE | UV | VAL 1 | NB | VAL.MAX |
|---|---|---|---|---|
| 0 | 000 | 0.25 | — | — |
| 1 | 0001 | 0.5 | ≤25 | 12.50 |
| 2 | 0010 | 1 | ≤25 | 25 |
| 3 | 0011 | 2 | ≤25 | 50 |
| 4 | 0100 | 4 | ≤25 | 100 |
| 5 | 0101 | 8 | ≤25 | 200 |
| 6 | 0110 | 16 | ≤25 | 400 |
| 7 | 0111 | 32 | ≤25 | 800 |
| 8 | 1000 | 64 | ≤25 | 1600 |
| MAX. TOTAL | | 127.50 | | 3187.5 |

FIG.9

| CODE | UV | VAL 1 | NB | VAL MAX |
|---|---|---|---|---|
| 0 | 0000 | 0.25 | — | — |
| 1 | 0001 | 0.5 | ≤25 | 12.5 |
| 1 | 0001 | 0.5 | ≤25 | 12.5 |
| 2 | 0010 | 1 | ≤25 | 25 |
| 2 | 0010 | 1 | ≤25 | 25 |
| 2 | 0010 | 1 | ≤25 | 25 |
| 3 | 0011 | 2 | ≤25 | 50 |
| 3 | 0011 | 2 | ≤25 | 50 |
| 4 | 0100 | 4 | ≤25 | 100 |
| 5 | 0101 | 8 | ≤25 | 200 |
| 6 | 0110 | 16 | ≤25 | 400 |
| | | | TOTAL | 900 |

FIG.9A

TRANSACTION SYSTEM OF THE ELECTRONIC PURSE TYPE

This is a continuation of application Ser. No. 350,146, filed May 10, 1989, now U.S. Pat. No. 4,992,646.

The invention relates to the technical field of microcircuit (chip) cards, referred to herein more shortly as "card(s)". The invention relates more particularly to their application as means of payment.

BACKGROUND OF THE INVENTION

Magnetic track bank cards are already used for this purpose on a wide scale. The first steps have been taken for changing over to bank cards including microcircuits or chips. In cards of this type, the memory processes a sum of money like a number which is encoded on a plurality of bytes or memory cells, in the same way as an accounting operation or a check are processed. There is thus no simple relationship between each memory bit and a unit of monetary value. It is therefore necessary to take steps to ensure that the card user and the card itself are credit-worthy. The means most commonly used for this purpose is the confidential code. Verifying a confidential code requires a procedure which complicates card manipulation.

To some extent, systematic use of a confidential code can be omitted by using so-called "prepaid" cards. In such cards, each memory bit possesses a monetary value fixed in advance. As the name specifies, the card owner pays for the value thereof prior to making use of it. The card itself is thus totally credit-worthy. And since the sums of money concerned are relatively small, there is no need to verify that a card holder is indeed its legitimate owner.

Prepayment type "telephone" cards are currently in use in France with public payphones. They are easy to implement since all telephone charges can be defined as a number of telephone units to be paid.

There is a need for prepaid type cards which are suitable for a wider range of applications than telephone cards. In other words there is a need for an electronic purse card or wallet card.

One of the problems encountered is that of optimizing the card, given that its memory capacity is limited and that the number of times a card can be reloaded is also limited. Other factors are involved, such as the fact that the memory is made in erasable programmable read-only memory (EPROM) technology, or in electrically-erasable programmable read-only memory (EEPROM) technology, also written "E$^2$PROM". A distinction should also be made between cards containing a memory associated with a hard-wired logic circuit, generally on the same chip, and cards containing a memory and a microprocessor either on a single chip or else on two separate chips.

Another point to observe is that it is necessary, in practice, to avoid the need for "giving change" during transactions. This means that a card needs reloading only when the user desires to obtain more cash (in the card), which operation may require verification of the user's credit-worthiness.

An object of the present invention is to provide solutions to these problems.

SUMMARY OF THE INVENTION

The invention thus provides a transaction method for a system of the type comprising at least one terminal and a microcircuit card suitable for cooperating with the terminal. The card includes a permanent write memory (which is optionally renewable E$^2$PROM) having at least some of its bits associated with a corresponding value unit, said memory being consumable by writing.

According to a general feature of the invention, the memory contains a coding zone for defining at least one base value from which a sequence of value units can be established, said value units being spaced apart at successive powers of 2. The memory also contains a plurality of value words each associated with one of the value units, and each containing a predetermined number of value bits each possessing a value equal to said value unit. Finally the system includes calculation means which is just one way of implementing the inventive steps for splitting up a monetary amount into binary notation on the basis of said base value, and for issuing commands to write or not to write a value bit in each of said value words as a function of the bit of corresponding significance in said binary notation, with the remaining more significant bits serving, where appropriate, for writing in the most significant value word.

The Applicant has observed that statistically speaking, splitting up a monetary amount into binary notation gives, on average, as many zeroes as ones. Consequently, a card constituted as defined above should make it possible, on average, to perform a number of transactions equal to twice said predetermined number of value bits possessed by each value word.

Most advantageously, the encoding zone defines at least four and preferably at least six consecutive value units. However, this number should not be taken as being limiting. It may depend on the number of value words associated with the least significant value units. As explained below, it is possible to obtain an auxiliary value unit equal to one half of the basic value unit by consuming value bits that have already been established in the card. It is also shown that it is possible to associate a plurality of value words with the same value unit. Finally, it is possible to provide a plurality of sets of values operating as indicated above on the basis of different base values, either with or without overlap.

Preferably, each value word contains a coding subzone defining the value unit which is associated therewith. In other words, the above-specified coding zone is constituted by the set of coding subzones incorporated in the various value words.

However, it is possible for the coding zone to be separate from the words, and for it to define their respective value units by pointing to them, or by any other method of designation such as direct association of memory addresses with multiples of the base value unit which then becomes the only parameter that needs writing in the memory.

The invention also provides that in the absence of bits for certain value units, such bits may be regenerated by consuming bits of greater value. Various ways in which such "automatic change giving" can be implemented are described below.

The invention also provides a way of loading a card with any desired sum defined by the user. A full set of value words with all of their bits valid is initially created. Then in order to match the value preloaded into the card to the desired sum, a sum equal to the difference between the maximum value of the card and said desired sum is consumed immediately by writing.

Provision is also made for reloading the card by a desired sum before all of the value bits in the card have been consumed. At least for EPROM technology cards, this reloading mode consists in creating at least one value word too many (in theory, this word is amongst the most significant words), with a sum equal to the excess amount being consumed immediately by writing.

In a particularly advantageous embodiment, each value word possesses an integer number of 8-bit bytes, and preferably 32 bits, which are used as follows: two reserved bits; twenty-five value bits; four bits for defining the value unit associated with the word; and one validation bit. The validation bit confirms that the sum specified by the value word has indeed been prepaid and certified by the organization which guarantees payment. Such validation need not necessarily be incorporated in each value word.

Although the calculation means required for implementing the method can, at least in part, be located in the terminal, it is considered to be particularly advantageous for these calculation means to be located entirely in the card.

Although a loading technique based on the same principle as is used for debit operations has turned out to be most advantageous, it may be desirable to have a mechanism available for "giving change", i.e., for converting one or more bits corresponding to high value units into a larger number of bits corresponding to lower value units, whenever there is a shortage of such bits.

In this respect, a variant of the invention proposes a different technique enabling the use of the card as an electronic purse to be generalized and extended simultaneously to other applications, while simplifying its operation in a substantial manner.

In a highly advantageous variant of the invention, the transaction system further includes treatment means for preloading the card with a desired sum expressed in common monetary units and certified, and means suitable for verifying that the cumulative value of debits expressed in the same value units remains no greater than the sum preloaded in this way.

Thus, already-existing certification and security techniques can be used for loading a sum into the card with the sum being expressed, for example, in francs. Only the amount of one or more debits will be expressed in the value units of the "purse", and the total of debits already performed in this way is verified to be no greater than the certified monetary amount available in the card.

In theory, value bits would only be created to be available for debit purposes insofar as the total of the available value bits does not exceed the sum preloaded into the card.

Further, a scale of value words can be created as a function of the order of magnitude of the amount of a transaction to be performed.

Instead of giving change in a given value unit for which there is a shortage of value bits, the value word corresponding to said value unit can merely be regenerated, providing the preloaded sum includes sufficient credit.

Even more simply, all of the remaining value bits can be cancelled and one or more new scales of value words can be created.

BRIEF DESCRIPTION OF THE DRAWINGS

Embodiments of the invention are described by way of example with reference to the accompanying drawings, in which.

DETAILED DESCRIPTION

The accompanying drawings are, for the most part, definitive in nature. They therefore form an integral portion of the description and may be used not only for facilitating understanding thereof, but also, where appropriate, for contributing to the definition of the invention.

Figure 1:
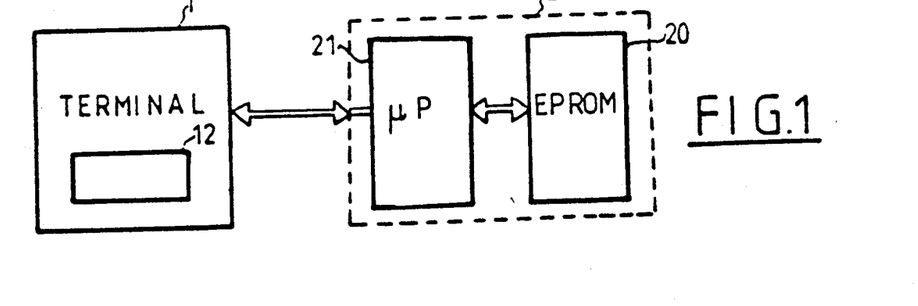
FIGS. 1 and 2 show two different embodiments of a transaction system suitable for implementing the invention.

In FIG. 1, a terminal 1 provided with processing and calculating means 12 is in interaction with a card 2 possessing a microprocessor 21 controlling a memory 20, e.g., of the erasable programmable read only memory (EPROM) type. It could be constituted by a two-chip card, but it is currently preferred for the memory and the microprocessor to be integrated on the same chip.

Figure 2:
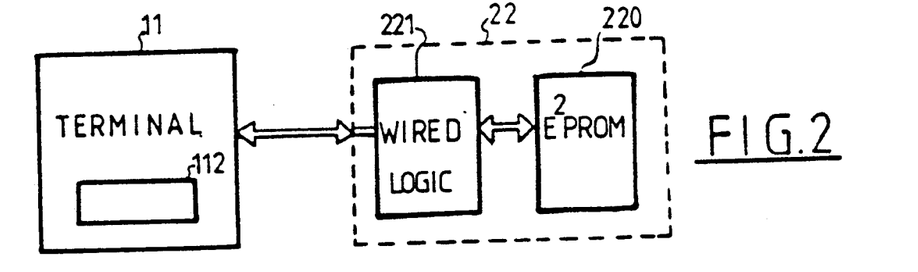

In FIG. 2, a terminal 11 provided with processing and calculation means 112 is coupled with a card 22 provided with a hard-wired logic circuit 221 controlling a memory 220 on the same chip.

The memory may be of the electrically erasable programmable read only memory (EEPROM) type, sometimes also written $E^2PROM$.

This is one of the main types of card currently available on the market.

More generally, a card of the invention includes a permanent write memory (which is renewable if $E^2$-PROM technology is used). The term "permanent write" is used herein to mean that writing into the memory is considerably more difficult than reading it, and that the memory is nonvolatile.

Memories which are usable in the invention are electrically programmable read only memories for which the electrically controlled programming operation corresponds to permanent writing as defined above. In a prepaid card, nonwritten bits have corresponding value units attributed thereto, and these units are consumed by writing to the bit.

Reprogramming a card assumes that it is possible to erase its memory. Only $E^2PROM$ memories are electrically erasable. EPROM technology memories can be erased only by other means, e.g., by exposure to ultraviolet radiation. Cards which incorporate EPROM memories are constructed in such a way as to prevent erasure taking place.

In this respect, the safety measures which are considered as ensuring the integrity of chips inside the card and the techniques for monitoring proper use of the memory as a whole are considered as being known to the person skilled in the art.

Figure 3:
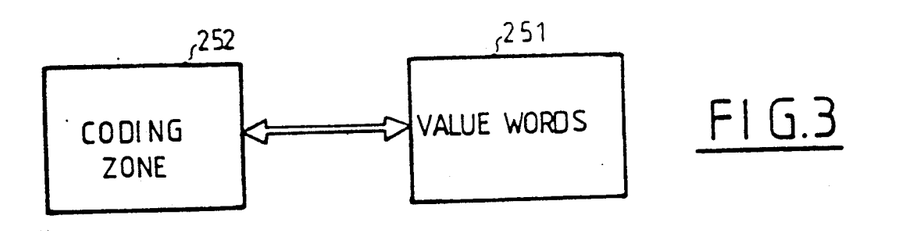
FIG. 3 is a diagram illustrating the interaction, in accordance with the invention, between the coding zone and the value words.

In accordance with the invention (FIG. 3) the memory (20 or 220) contains a coding zone 252 for coding a sequence of value units which are spaced apart at successive powers of 2, starting from a base value, together with a plurality of value words 251 each of which is associated with one of the value units and each of which contains a predetermined number of value bits each possessing said value unit.

Figure 4:
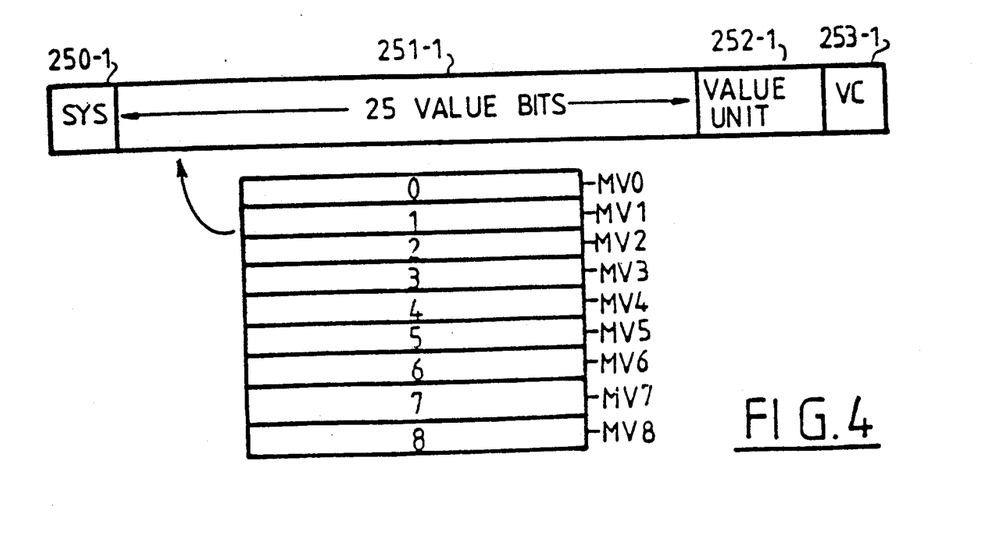
FIG. 4 illustrates the structure of an electronic purse in accordance with a preferred embodiment of the present invention.

FIG. 4 shows value words MV1 to MV8 together with an optional word MV0 whose function is described below.

In a particular embodiment of the invention, each word occupies 32 bits. The structure of the word MV1 is described by way of example; it comprises:
two system bits 250-1 reserved for monitoring aplications, for example;
twenty-five value bits 251-1;
four value unit bits 252-1; and
one validation bit 253-1.

The four value unit bits can be used to encode up to 16 different value levels. In the present version of the invention, it is considered that eight different value levels suffice, at least for the basic version of the electronic purse.

Depending on whether each of the twenty-five value bits is in the blank or nonwritten state (which state is conventionally called "zero"), or in the written state, called "1", it has the value defined by the zone 252-1, which for the word MV1 under consideration constitutes the "base value" of the electronic purse.

Validation is performed by causing the bit 253-1 to be written to the "1" state after it has been confirmed (under conditions defined above) that the value bits have indeed been loaded with the associated value unit. It may be observed that the validation bit 253-1 could be made using a different technology enabling a write operation to be made even more irreversible, e.g., by using fuses incorporated in the chip.

In a variant of the above, instead of incorporating the value unit 252-1 in each value word, they could all be defined in a coding zone 252 placed in an entirely separate location in the memory. In this case, the value of the bits in each value word is defined by correspondence between the value word and a point in the coding zone, with such a function being performed, for example, by means of pointers or by any other addressing system, be it direct, indirect, or implicit. The same applies to the validation bit.

Figure 5:
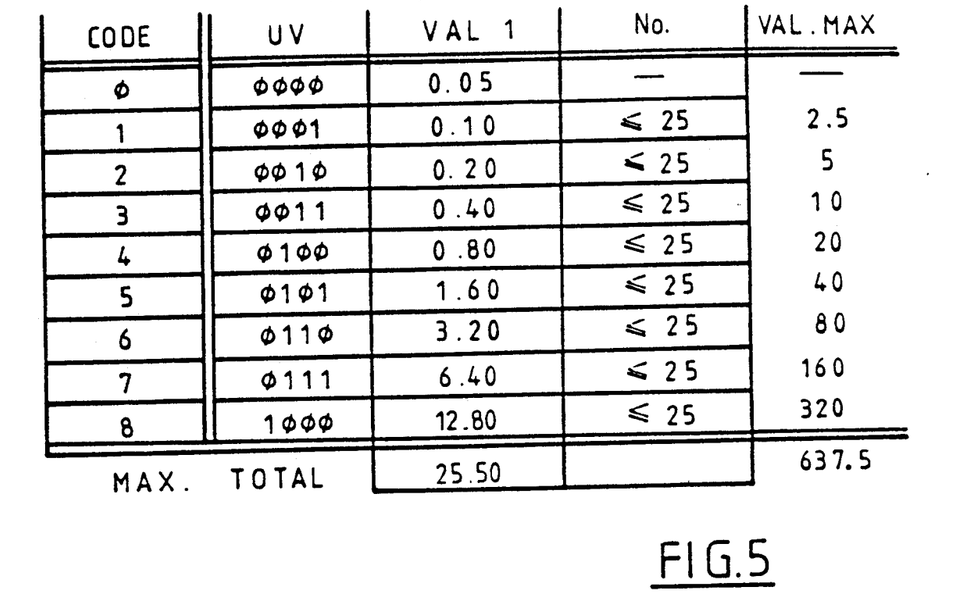
FIG. 5 shows an example of a practical implementation of an electronic purse in accordance with the invention.

The capabilities of an electronic purse of the invention will be better understood from the example shown in FIG. 5. The value word of rank 1 corresponds to the base value unit (code UV=0001), which corresponds, for example, to 0.10 of a monetary unit, such as the franc. Up to twenty-five bits of this value unit may be loaded, corresponding to a maximum value of 2.5 francs. The word of rank 2 has the code UV=0010, for a value unit of 0.20, which gives 5 francs on twenty-five bits. Continuing in the same manner, the word of rank 8 has a unit value code of 1000 giving a unit value of 12.80 francs, and a maximum value of 320 francs.

Using a single value word per value level, the maximum value of the electronic purse defined in this way is 637.50 francs.

Figure 5A:
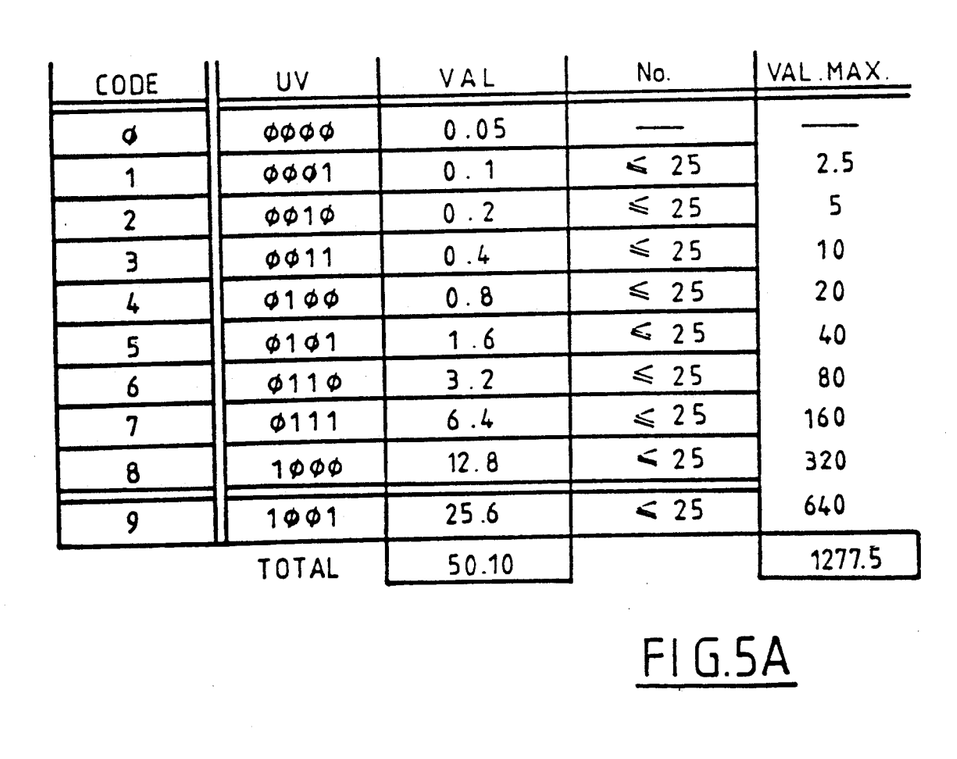
FIG. 5A shows a variant thereof.

FIG. 5A shows a variant in which a value word of rank 9 is also used having a unit value of 25.6 francs for a maximum value of 640 francs for this word, thereby raising the value of the electronic purse as a whole to 1277.50 francs.

It will be seen in FIGS. 5 and 5A that the optional code word 0 can be used for splitting up value bits of greater significance into value units equal to one half of the base value (code 1), i.e., down to 0.05 francs. At present, initial loading of this value word of code 0 is considered unnecessary.

It is now assumed that a value of 400 francs is to be loaded into a card which is completely blank, i.e., which has had no value loaded therein previously. This is described with reference to FIG. 6.

The card used is the electronic purse shown in FIG. 5, i.e., in which neither the value word of rank 9 nor the word of rank 0 are used, a priori.

Since the value to be inserted in the card is 400 francs and its maximum value is 637.50 francs, the difference is 237.50 francs. When divided by the base value unit UVB, this difference corresponds to 2375 units, which in binary gives:

10010 1000111

In order to load the card, all of the value words of ranks 1 to 9 are initially filled completely. Then, the binary value mentioned above is written in from right to left. Each time that a 1 bit is encountered, a value bit in the value word of corresponding rank is consumed by being written to. For example, in the case shown in FIG. 6, a value bit is consumed in each of value words MV1, MV2, MV3, and MV7.

Figure 6:
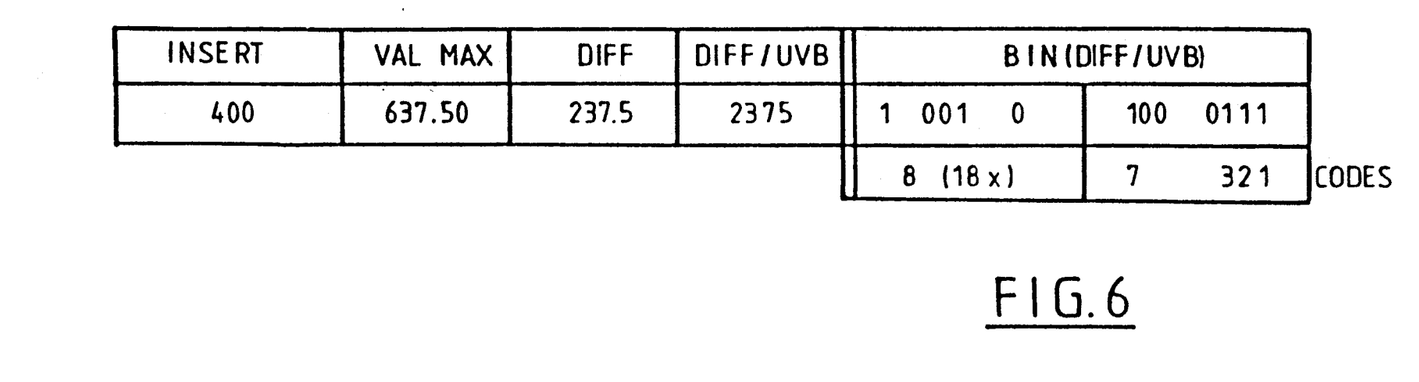
FIG. 6 illustrates one example of how the FIG. 5 electronic purse can be initially loaded.

The remainder of the binary value expressed above corresponds to 18 units of the value word of rank 8, and thus 18 bits in this word are consumed.

After this has been done, the validation bits 253 in each of the value words are confirmed.

The invention provides a particularly simple and elegant means for loading a value into an electronic purse while ensuring that a very large number of value bits remain available at each of the levels or value words implemented in the electronic purse.

Figure 6A:
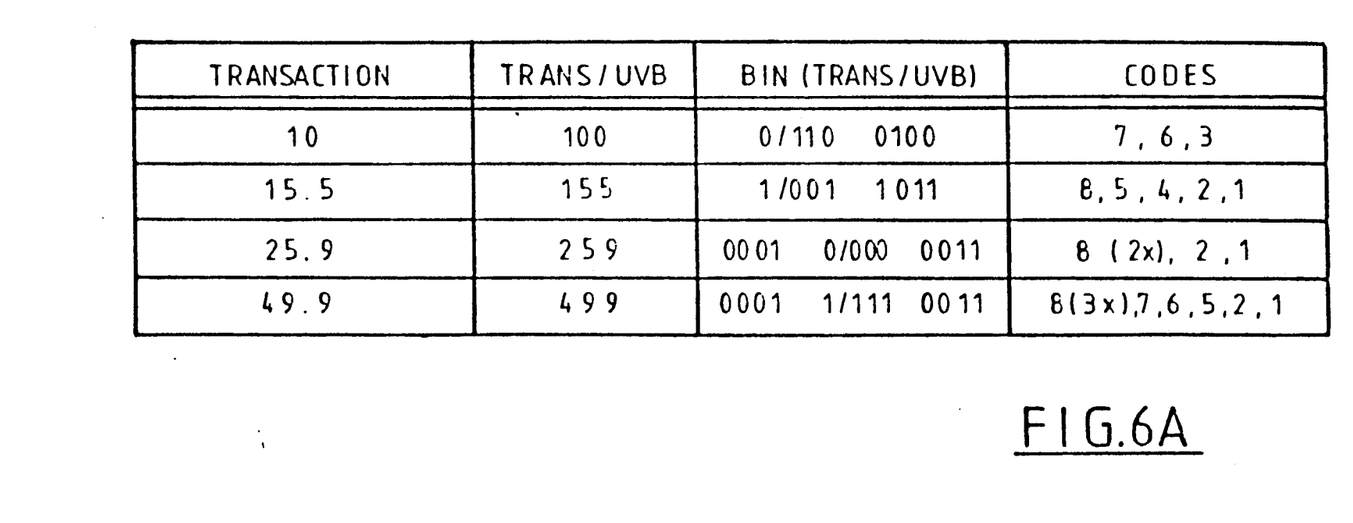
FIG. 6A shows four different transactions possible with the FIG. 6 electronic purse.

Thereafter, transactions can be performed as shown in FIG. 6A. A ten franc purchase corresponds to 100 times the base value unit. The number 100 is written in binary and FIG. 6A shows that a value bit should be consumed in each of the words MV3, MV6, and MV7. FIG. 6A contains three other examples, for transactions of 15.5 F, 25.9 F, and 49.9 F, respectively.

The above description is equally applicable to cards having EPROM and $E^2$PROM type memories, regardless of whether access is controlled by hard-wired logic circuits or by microprocessor.

The above-described example is based on the fact that most transactions in France are currently expressed to a round number of 10 centimes, even though the smallest value coin currently in circulation is worth only 5 centimes.

Should it be necessary to make use of value word MV0 in which each bit is worth 5centimes, this can be done in the form of twenty-four bits giving an overall value of 1.2 francs by consuming one value bit from word MV3 and one value bit from word MV4. Here again, it is initially assumed that there are twenty-five value bits in the word MV0, and one of these bits is immediately consumed in order to bring the number down to twenty-four, whereupon the validation bit 253-0 of the word MV0 is confirmed. This may be performed by the microprocessor 21, or by cooperation between the hard-wired logic 221 and a secure terminal.

After loading 400 francs as described with reference to FIG. 6, at least twenty-four bits are available in each of value words MV1 to MV7, and nine bits are available in value word MV8.

Regardless of the value of any purchase, this means that at least twenty-four transactions can be guaranteed, so long as the total value of the purchases does not exceed the total amount originally loaded into the card.

A nonnegligible advantage of the invention is that each transaction or purchase can be performed without giving change while consuming no more than one value bit for each value unit, other than bits of the highest value unit.

If account is taken of the fact that, in practice, the value of a given purchase or transaction when expressed in binary has equal chances of giving rise to zero bits and one bits, then the number of possible transactions may well be higher. However, there is no guarantee that any particular sequence of transactions performed by a particular user will satisfy this statistical norm.

The invention therefore also provides for internal means for regenerating value words that are prematurely emptied, by taking value from words which are not yet emptied. This is a kind of "automatic value unit change giving" operation which does not alter the value contained in the card (unlike "reloading" as described below).

The basic situation is one where the total residual value in the card has not been expended, but the word or words associated with a given value unit are spent out. This happens after at least twenty-four transactions have been performed, assuming that the initial loading was as described with reference to FIG. 6.

As a general rule, a word having twenty-four value bits of value unit of rank I can be revalidated by consuming one value bit whose value unit is of rank I+3, together with one value bit whose value unit is of rank I+4.

Figure 7:
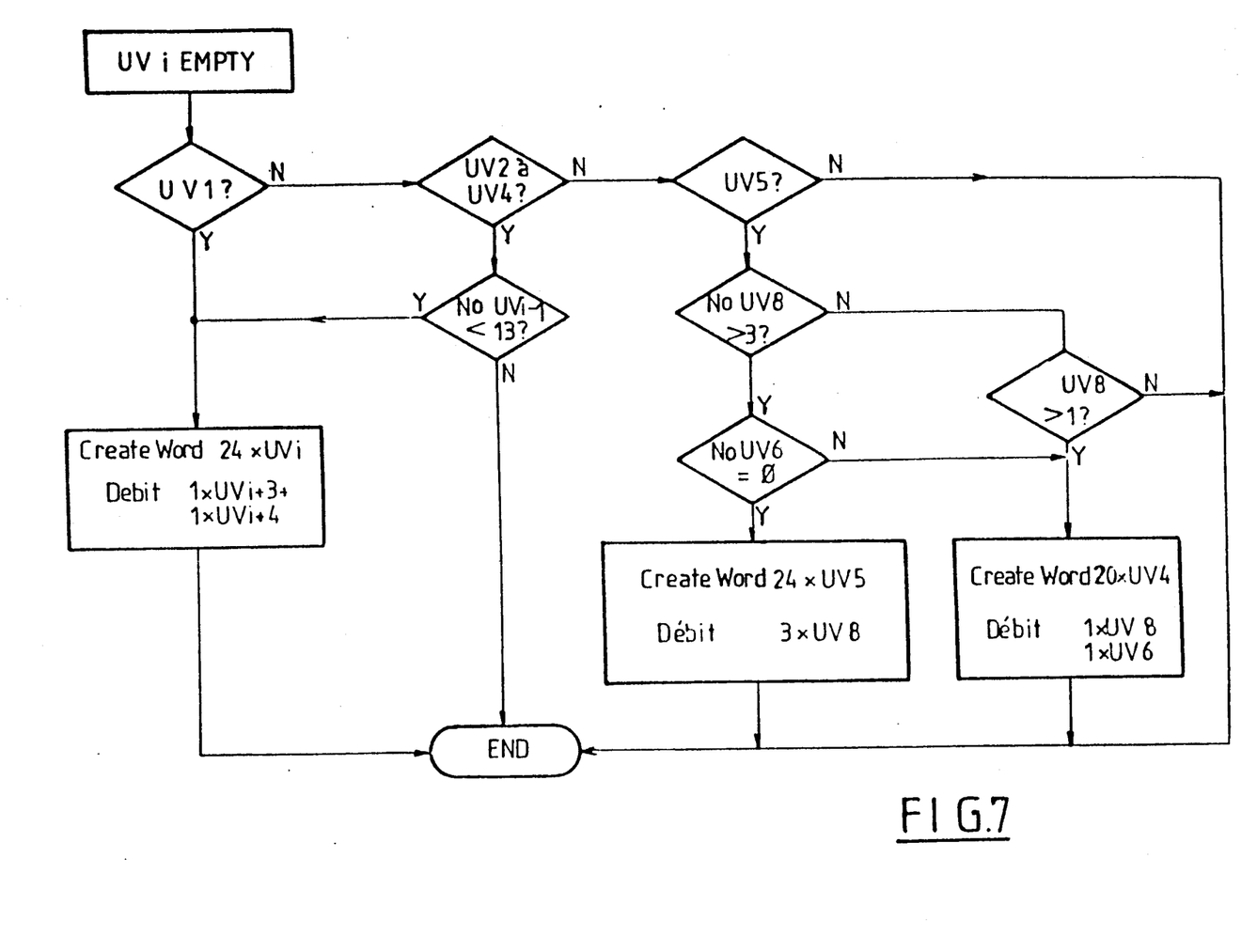
FIG. 7 is a flowchart of a mechanism for regenerating value bits in a purse of the invention.

FIG. 7 shows a preferred implementation of this mechanism.

The starting point is the observation that value unit UVi is empty.

If the value unit concerned is of rank 1, then the mechanism explained below is always applied.

Otherwise, if it is a value unit of greater significance, in this case UV2 to UV4, a search is made initially to see whether the number of bits remaining on the value unit of next smaller rank is less than thirteen (i.e., equal to not more than half of twenty-four). If more than half the points remain in the next smaller value unit, it is simpler to consume two bits of this next smaller value unit rather than one bit of the missing value.

Otherwise the mechanism described below is applied.

For value units of even higher significance, automatic change is given only if performing such an operation does not involve using bits of the highest value or greater.

In the example of FIG. 7, nothing is done for value units UV6, UV7, and UV8.

However, for value unit UV5, a check is made initially to verify that there remain more than three value bits in level UV8. This is a necessary condition to be able to regenerate value units at level UV5. If this condition is satisfied, a test is also made to see whether rank UV6 is empty. If it is, a word of twenty-four value units of rank UV5 is created in return for three value bits of rank UV8.

Otherwise, if value bits remain in rank UV6, it is preferable to create a word having twenty value bits of rank UV4 in return for one value bit of rank UV8, and one value bit of rank UV6.

Finally, if there remains no more than one value bit of rank UV8, then nothing is done since it is then not appropriate to consume this value bit.

Overall, value units are changed automatically following the above-specified mechanism except insofar as:

for value units of less significance, more than half of the value bits of the next lower rank are present; and for value units of greater significance, the number of even greater value units remaining is not enough to enable an automatic change operation to take place.

When using an $E^2PROM$ card, its value words are advantageously reconfigured in optimum manner, since they can be erased electrically. The operation is then similar to reloading as described below, except that the total value is not changed.

The reloading of a card in accordance with the invention with value units is now described with reference to FIG. 8.

The above-described automatic change giving process does not necessarily require a terminal to be present (unless the calculation means incorporated in the card are insufficient to enable the card to perform the work on its own). However, both the initial loading of the card with value units and the reloading thereof with value units require cooperation between the card and the terminal.

When using an $E^2PROM$ technology memory, reloading is similar to initial loading: the residual value of the card is added to the value to be transferred thereto (as appropriately certified). After the memory has been erased, it can be completely reconfigured in the same way as during initial loading, described above.

Such erasure is no possible using an EPROM technology memory. The following description relates to various other methods, which are applicable to both technologies.

Firstly, reloading can be considered as being a kind of initial loading operating in the manner described above, and new value words can be added which are disjointed from the existing value words.

Advantageously, this initial loading type of mechanism may be replaced by generating value bits in levels 8, 7 and/or 6, by looking for the nearest higher value which makes it possible to obtain a maximum number of generated value bits while minimizing the number of validated value words. The reloaded amount is adjusted to match the desired sum by debiting the difference between the value of the validated word or words and the value of the reloading amount.

The debit is performed in the same way as a payment transaction.

The reloading value is chosen by the cardholder, and it may lie, for example, in the range 30 francs to 600 francs when using the FIG. 5 electronic purse.

Figure 8:
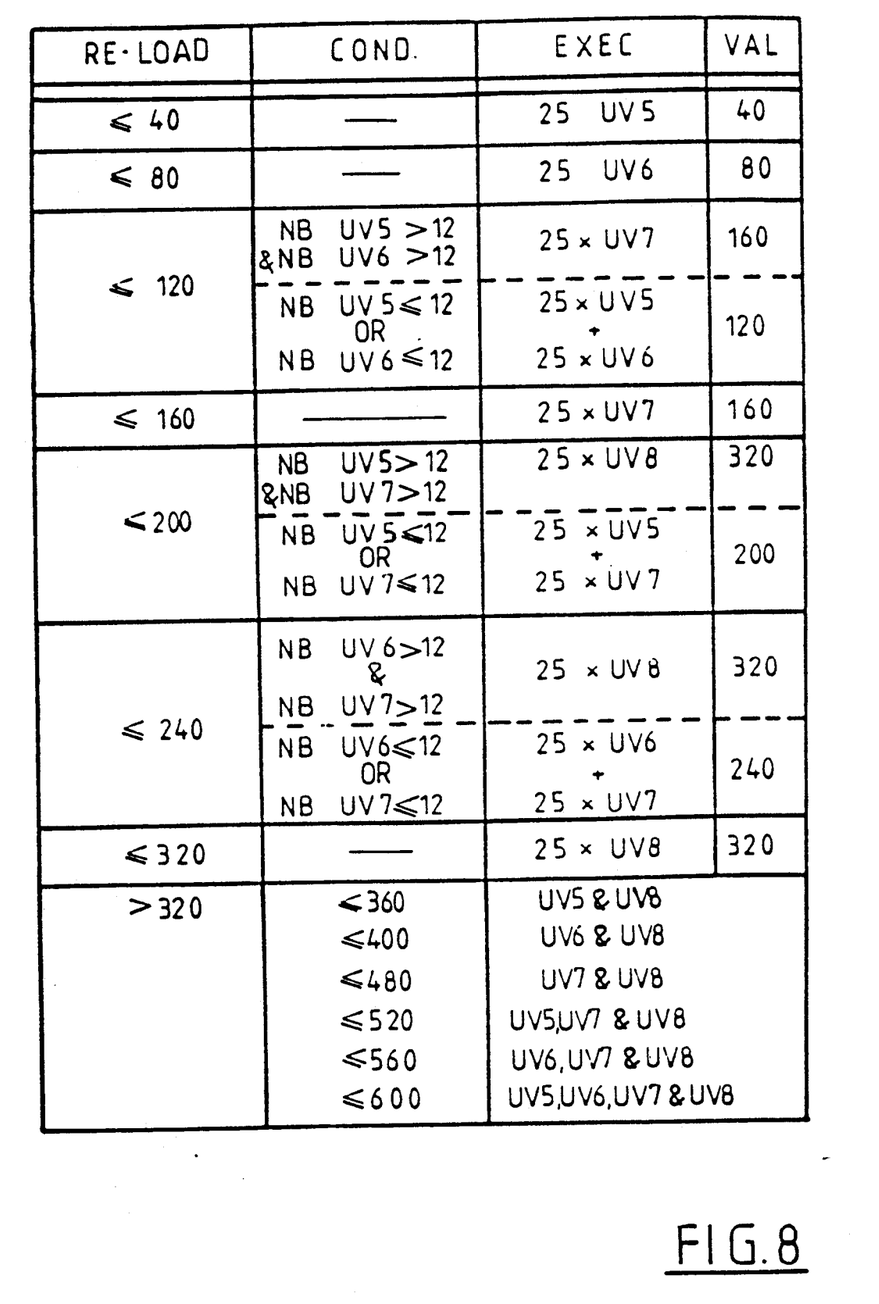
FIG. 8 shows various conditions applicable to reloading the electronic purse of the invention with value units, and FIG. 8A compares two of these situations.

FIG. 8 summarizes the optimum reloading means as a function of the range in which the selected reloading value is to be found. In this respect, since the value to be reinserted increases going down FIG. 8, this figure thus defines a sequence of possible reloading value ranges.

If the value to be reloaded is not greater than 40 francs, then a word is validated comprising twenty-five value bits at level 5 (for 40 francs), and then the appropriate number of bits is consumed to reduce the reloaded value to the desired amount, and the validation bit is then, naturally, confirmed (this operation is always performed when a value word is created, but it is not mentioned every time in the description below).

The same technique is applied if the amount to be loaded lies between 40 and 80, but this time using twenty-five value bits of level UV6.

Exactly the same procedure could be applied if the value to be reloaded lies in the range 80 to 160, using value bits at level UV7. However, as shown in FIG. 8, if the amount to be reloaded lies in the range 80 to 120, and if less than half of the value bits at level UV5 or at level UV6 remain, it is preferred to load two new words at these levels, rather than to load a single word at level UV7. However, this is an option which is not strictly necessary for performing the present invention.

The remainder of the table is to be read in the same way, up to a level of 320 francs. The above-mentioned option with respect to level 120 also exists for levels 200 and 240.

Beyond 320, it is currently considered preferable to look for the minimum number of value words that can be loaded, and then to combine value units which satisfy this condition while giving more weight to smaller value units. In the example described, for amounts greater than 320 francs, the following are loaded:

value bits UV5 and UV8 if the amount is not greater than 360;
value bits UV6 and UV8 if the amount is not greater than 400;
value bits UV7 and UV8 if the amount is not greater than 480;
value bits UV5, UV7, and UV8 if the amount is not greater than 520;
value bits UV6, UV7, and UV8 if the amount is not greater than 560; and
value bits UV5, UV6, UV7, and UV8 if the amount is not greater than 600.

Figure 8A:
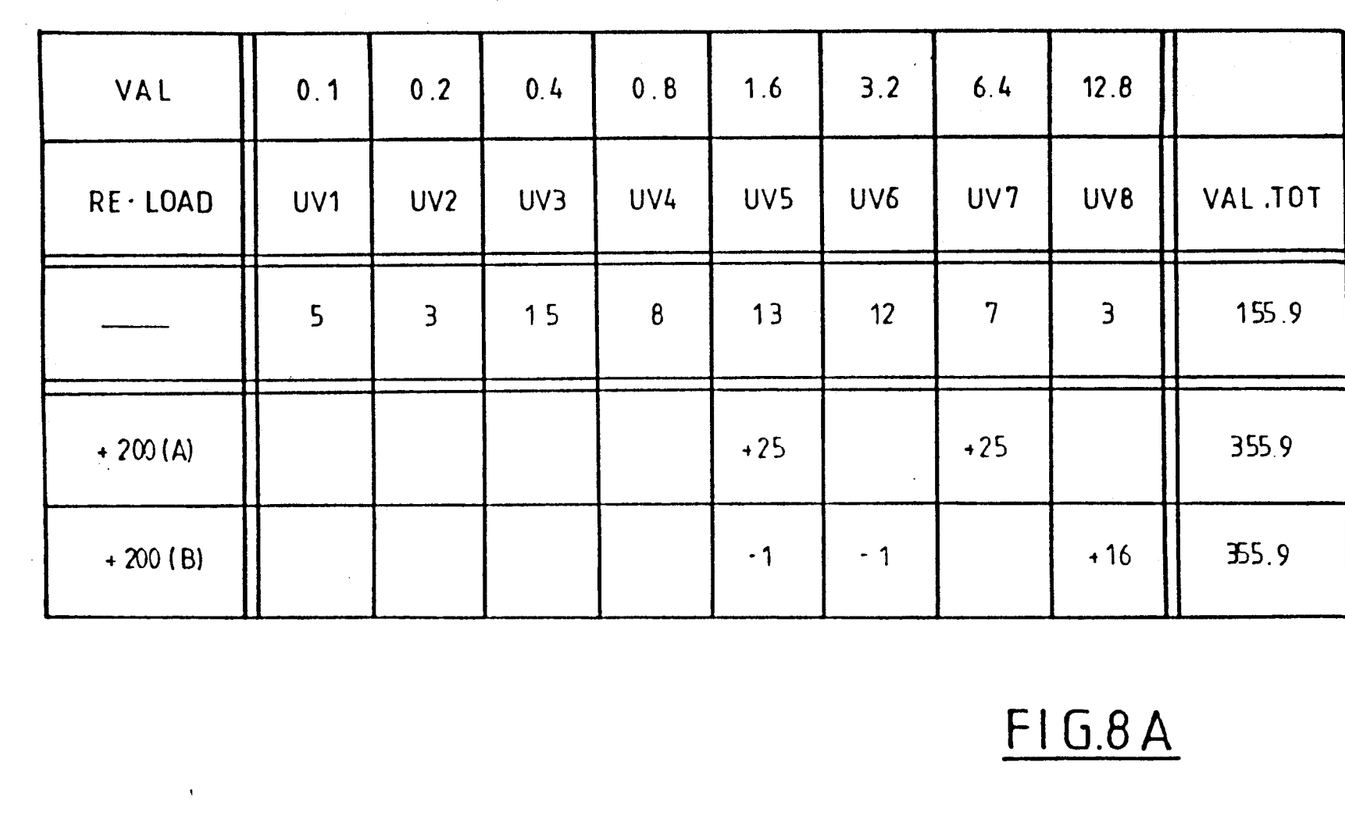

FIG. 8A shows the advantage of using intermediate levels such as level 200 as shown in FIG. 8.

Assume that the state of the electronic purse prior to reloading is as shown in the first line of numbers in FIG. 8A, giving a total value of 155.90 francs.

In the first case, 200 francs are loaded in the form of twenty-five value units in rank UV5 and also in rank UV7. The card now has more "change".

In the second case, sixteen value units of rank UV8 are loaded and one value unit is consumed in each of ranks UV5 and UV6. These levels which were already fairly well stocked are not excessively penalized. The cardholder will have fewer problems with high value transactions since a large number of bits of rank UV8 remain to be consumed.

However, in most applications, it will be unusual to use an electronic purse for transactions for amounts close to the maximum value. That is why the first procedure (line marked (A)) in FIG. 8A seems preferable, even if it requires two words to be validated.

This example shows the advantage of the conditional splits appearing at levels 120, 200, and 240, in FIG. 8.

Figure 9:
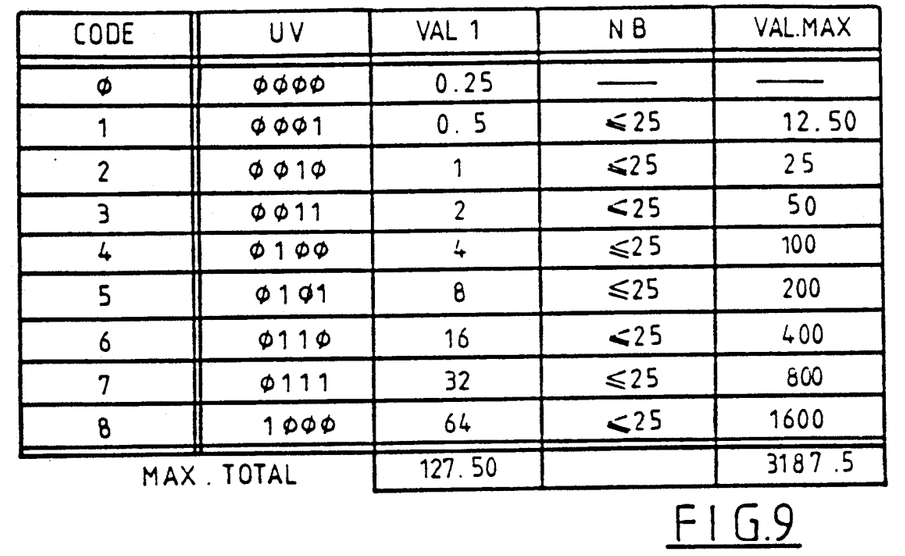
FIGS. 9 and 9A show two other embodiments of an electronic purse in accordance with the invention.
Figure 9A:
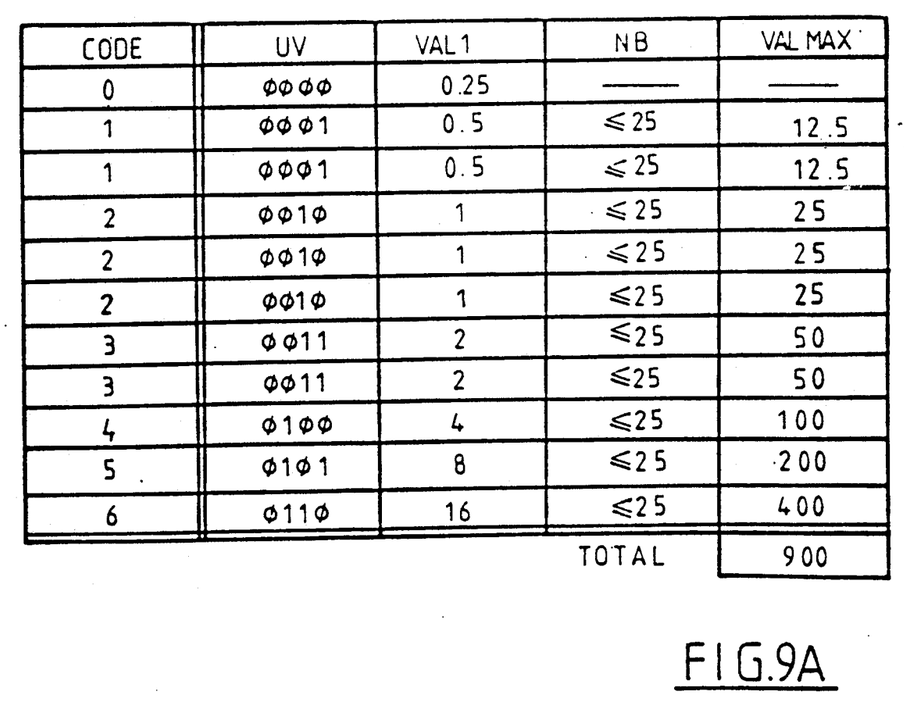

Another application of an electronic purse of the invention is now described with reference to FIGS. 9 and 9A.

In this case, it is assumed that transactions expressed in centimes are rare and the unit under consideration is closer to one franc. In this case, the base value unit is 0.50 francs. By loading levels 1 through 8 with twenty-five value bit each, this gives a total value to the purse of 3187.50 francs.

The person skilled in the art will understand that it is possible to have more than one value word per value unit level. This is shown in FIG. 9A using the same scale of value units as in FIG. 9. In this case, there are two value words for unit UV1, three for unit UV2, two for unit UV3, and one each for value units UV4 to UV6. The total value of the card is 900 francs.

As already mentioned, the invention is particularly applicable to the card of FIG. 1 since this card includes an internal microprocessor capable of performing all of the operations relating to transactions on its own, and is also capable of loading and reloading the card with value units, and of giving change automatically. In this case, it needs the terminal only for supplying validation for the cardholder's credit for an amount to be loaded. In general, this validation will itself comprise a certificate enabling the card to authenticate the organization entitled to guarantee the monetary values loaded into the card, and this may require a confidential code to be presented. In contrast, all of the transaction operations including automatic giving of change can be performed inside the card without any need to verify the confidential code, and without any need to take other security precautions.

When using a FIG. 2 card, at least with current technology, some of the functions required for loading and/or reloading words are not necessarily capable of being performed within the card itself. In which case the calculating means 112 in the terminal may be called on for assistance. The same may apply to automatic change giving. Naturally, it will be understood that the card may cooperate with two different types of terminals. One type is highly secure and installed, for example, in banks and is equipped to load or reload a card (and also to take part in automatic change giving, if necessary), whereas terminals of the other type are located on commercial premises or on any other location where simple transactions may be performed, and these terminals serve only to accept a transaction in exchange for value bits being consumed in the card, without special security precautions being taken.

It is specified above that it is not essential for a confidential code to be presented in order to enable an electronic purse to be used. However, presentation of a code may be envisaged.

This applies, in particular, when an electronic purse becomes an electronic wallet, i.e., when it is worth a greater amount.

For example, an electronic wallet could be constituted having the following characteristics:

a value unit 1001 for bits having a value of 50 francs each;
a value unit 1010 for bits having a value of 100 francs each;
a value unit 1011 for bits having a value of 200 francs each; and a value unit 1100 for bits having a value of 400 francs each.

On this basis, the following additional value levels may also be provided:

1000 for bits having a value of 25 francs each; and
1101 for bits having a value of 800 francs each.

In this respect, it may be observed that one of the bits provided for encoding the value unit is unnecessary, since three working bits suffice for encoding up to eight different levels of value unit. The fourth bit may be used for identifying the card of the invention as a purse or as a wallet, as the case may be.

Naturally, the present invention is not limited to the embodiment described. The person skilled in the art may extend it in various different ways.

In particular, a single card may have a plurality of memory zones coexisting therein each defining an electronic purse for a particular range of transaction amounts, and/or an electronic wallet satisfying the same conditions.

When the card contains a very low residual value which is unlikely to suffice for any transaction, it may be reimbursed in conventional bank notes and coin; after implementing appropriate security procedures, such as presenting a confidential code.

A card may also be restricted to transactions with one supplier only, in which case the supplier may be identified in the card in a secure manner.

In practice, it will be more frequent that a card has an expiration date which is specified, and the number of times a card may be reloaded may be fixed in advance, for example. This data may be fixed when the card is first issued.

The monetary unit value may be encoded in the memory using a two's complement mode, or any other means ensuring that any change in the code as written can only have the effect of reducing the monetary value of a unit.

During a transaction, after value bits corresponding to the debit to be performed have been consumed, the microprocessor card may send a transaction certificate to the trader's terminal which may be executed by means of the calculation function in the card, e.g., making use of a protected and diversified secret key in the card.

In at least some applications, the card will be authenticated by the (debit) terminal and/or the (debit) terminal will be authenticated by the card. Authentication is always performed with high security terminals.

Various cipher methods are available for performing the above-mentioned security functions.

Finally, the terminal may contain a "black" list of cards not to be accepted, as is already done for bank cards.

Further, variants may be designed in the basic structure of the electronic purse, depending on applications. For example, if the base value unit is 0.5 francs, ten value words each having 16 bits may be provided, using two words for each of the values: 0.5 francs; 1 franc; 2 francs; and 4 francs; and one word for each of the values: 8 francs; and 16 francs. In this case, each 16-bit word contains 16 value bits and the associated value is defined merely by a memory address.

"Validation" processing does not make use of a validation bit in each value word, in this case. Validation is determined by the address of the first value word, by the number of value words, and by their respective values, all of which can be defined implicitly.

Finally, cards of the invention can be used for any monetary unit. They have the advantage of making it possible to perform processing using the European currency unit, or "ECU".

There follows an example for improving understanding of the variant of the invention relating to loading a microcircuit card.

Using known and conventional techniques for chip cards, a card may be loaded with the sum of 800 francs, for example, and certified using conventional means that need not be explained herein.

Simultaneously, an electronic purse can be created as described above and having the structure defined in FIG. 5. The total value of the value bits is 637.50 francs. This value is thus less than the amount preloaded into the card.

The card could equally well have been preloaded with only 500 francs, and verification could have been performed with each debit that the total amount of the debits performed so far does not exceed the originally-loaded 500 francs, even when the maximum amount of debits that the electronic purse can carry may be as much as 637.50 francs, which is more than 500 francs.

When all of the value bits of rank 1 have been consumed, it is naturally possible to completely reconstitute a value word of rank 1 (with reference to FIG. 5), provided there remains sufficient value of the sum preloaded into the card. However, it is also possible to completely reset the scale of value words after deducting the total amount of consumed value bits from the preloaded sum.

The same precautions should be taken as in the above-described system, i.e., each operation of writing to a bit should necessarily correspond to a certain amount of money being consumed, and not vice versa, and this should take account of the operating logic of the microprocessor.

When it is desired to reload a card fully as a "purse", it suffices merely to calculate the total amount of debits performed in its "purse" zone, to subtract this sum from the previously preloaded sum, and optionally to add additional preloaded sums or provisions to the results. The total is then written as a new preloaded sum and, as before, this makes it possible to set up a "purse" zone with spaced apart value units as described above.

The card is thus provided with a "credit" zone of conventional structure together with a "debit" zone having the structure described above. The advantage of processing these two zones separately also lies in the possibility of applying different security and/or enciphering procedures to each of them.

A greater degree of security should be attached to credit than needs to be attached to debit, since writing a debit bit can only reduce the value of the card.

Another advantage of the variant of the invention relating to loading a microcircuit card, lies in the value preloaded into the card serving not only as a source for replenishing the electronic purse of the invention, but also as payment for other types of transactions, all housed in a single card.

Naturally, the variant of the invention relating to loading a microcircuit card may also include all of the other variants described above.

In particular, the processing and calculating means mentioned above may be located, in part, in the terminal, or else they may be completely located in the card.

I claim:

1. A transaction method for a card having a permanent write memory with at least some of its bits associated with corresponding value units, the memory being consumable by writing, wherein the memory contains a coding zone defining at least one base value from which a sequence of value units can be established, the value units being spaced apart at successive powers of two, together with a plurality of value words, each associated with one of the value units, and each containing a predetermined number of value bits, each possessing a value equal to the associated value units, the method comprising the steps of:

representing a monetary amount in binary notation on the basis of the base value;

selectively writing a value bit in each of the value words as a function of the bit of corresponding significance in the binary notation; and writing any remaining more significant bits in the most significant value word.

2. The method of claim 1 wherein the coding zone defines at least four consecutive value units.

3. The method of claim 1 wherein the coding zone defines at least six consecutive value units.

4. The method of claim 1 further comprising the step of defining the associated value unit for each word in a coding subzone, the coding zone consisting in the coding subzones taken together.

5. The method of claim 1 wherein the coding zone is distinct from the words, and the method further comprises the step of defining the value units by pointing to the words or their addresses.

6. The method of claim 1 further comprising the steps of defining in the coding zone a value of one-half of the base value, together with a corresponding value word, and validating this corresponding value word by consuming value units of more significance.

7. The method of claim 1 further comprising the step of regenerating a value word corresponding to the base unit in the absence of value bits for the base value unit, and writing to a value bit in at least one of the more significant value units.

8. The method of claim 1 further comprising the steps of regenerating a value word corresponding to a less significant value unit in the absence of value bits for the less significant value unit and the falling of the number of value units of the next smaller significance below a predetermined threshold, and writing to a value bit in at least one value unit of greater significance.

9. The method of claim 1 further comprising the steps of regenerating a value word corresponding to a more significant value unit, in the absence of value bits for the more significant value unit and for the value unit of next greater significance, where the number of value units of maximum significance is greater than a predetermined threshold, and writing to a value bit in at least one value unit of greater significance.

10. The method of claim 1 further comprising the step of loading the card with a desired sum by creating a set of value words having all of their bits valid, then consuming a sum equal to the difference between the maximum value of the card and the desired sum by writing to appropriate bits.

11. The method of claim 1 further comprising the step of reloading the card by a desired sum by creating at least one excess value word of the greatest significance, then consuming a sum equal to the excess by writing to appropriate bits.

12. The method of claim 11 further comprising the step of selecting the value word created as a function of the relationship between the desired sum and the maximum value of each word.

13. The method of claim 12 wherein each created value word is also selected as a function of the relationship between the desired sum and the sum of the maximum values of a plurality of words associated with different value units, and as a function of the number of value bits remaining for these value units.

14. The method of claim 1 wherein each value word possesses an integer number of 8-bit bytes.

15. The method of claim 1 further comprising the steps of preloading the card with a desired sum expressed in ordinary monetary units and certified, and verifying that the total value of debits in the value unit remains no greater than the preloaded sum.

16. The method of claim 15 further comprising the step of regenerating the value word corresponding to a given value unit in the absence of value bits for the given value unit, so long as the preloaded sum continues to contain no less than the value thereof.

17. The method of claim 15 further comprising the step of deducting the total value of consumed value bits from the preloaded sum.

* * * * *